United States Patent [19]

Lippera

[11] 4,176,274
[45] Nov. 27, 1979

[54] METHOD OF COUPLING PLASTIC PIPES BY WELDING AND A CONNECTION PIECE FOR COUPLING SAME

[75] Inventor: Noël Lippera, Blenod les Pont-A-Mousson, France

[73] Assignee: Pont-A-Mousson S.A., Nancy, France

[21] Appl. No.: 789,327

[22] Filed: Apr. 20, 1977

[30] Foreign Application Priority Data

Jun. 3, 1976 [FR] France .................. 76 17182

[51] Int. Cl.² .............................................. H05B 3/58
[52] U.S. Cl. .................................... 219/522; 156/275; 264/272; 219/544; 219/535
[58] Field of Search ............... 219/544, 522, 535, 521; 156/275; 264/272

[56] References Cited

U.S. PATENT DOCUMENTS

| | | | |
|---|---|---|---|
| 2,454,666 | 11/1948 | Morris | 219/535 X |
| 3,061,503 | 10/1962 | Gould et al. | 219/544 X |
| 3,062,940 | 11/1962 | Bauer et al. | 219/535 |
| 3,094,452 | 6/1963 | Von Riegen et al. | 219/544 X |
| 3,506,519 | 4/1970 | Blumenkrantz | 219/544 X |
| 3,788,928 | 1/1974 | Wise | 156/275 |
| 3,849,630 | 11/1974 | Halliday | 219/544 |
| 3,943,334 | 3/1976 | Sturm | 219/544 |
| 3,987,276 | 10/1976 | Vogelsanger et al. | 219/535 |
| 4,090,899 | 5/1978 | Reich | 285/292 |

Primary Examiner—Roy N. Envall, Jr.
Assistant Examiner—M. Paschall
Attorney, Agent, or Firm—Sughrue, Rothwell, Mion, Zinn and Macpeak

[57] ABSTRACT

The coupling of two tubular elements is achieved by welding them together by energization of an electrical resistance element, the one element comprising a male end, the other a socket end. The coupling operation is carried out by means of a composite connecting piece comprising two rings which are fitted on one another, one acting as a support for a bifilar electrical resistance element and the other as a sheath. The electrical resistance element is thus uniformly coated in plastic material and is accurately centered, thereby ensuring uniform heating and welding. This coupling method is for use in coupling discharge pipelines for waste water and rain water and for conduits for industrial fluids.

3 Claims, 6 Drawing Figures

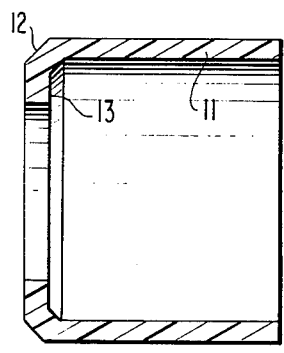
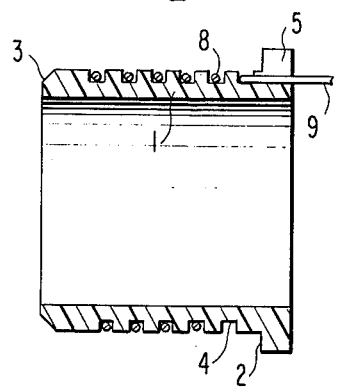
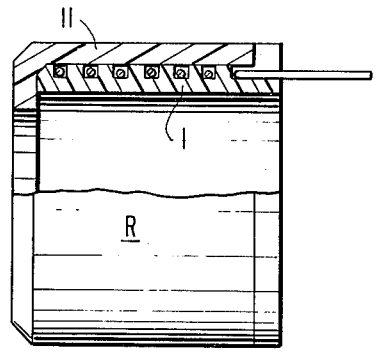
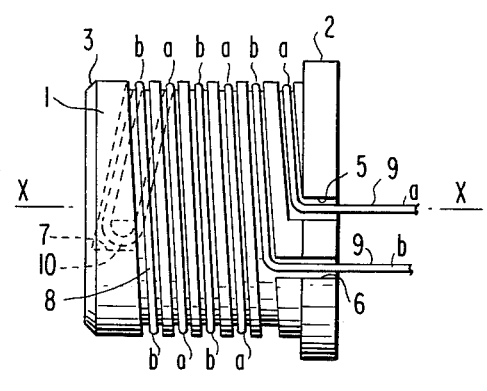
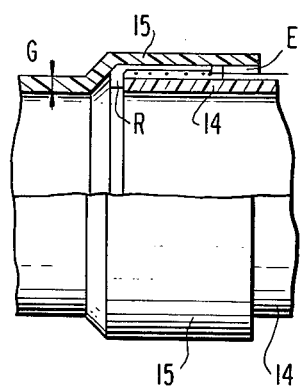
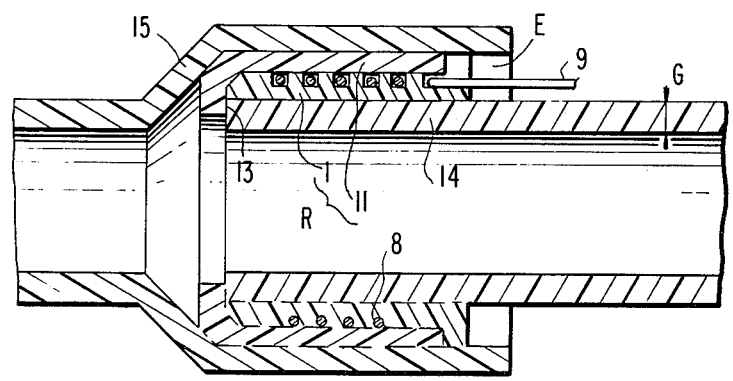

METHOD OF COUPLING PLASTIC PIPES BY WELDING AND A CONNECTION PIECE FOR COUPLING SAME

BACKGROUND OF THE INVENTION

1. Field of the Invention

The present invention relates to the coupling of plastic pipes by welding them by electrical resistance heating.

More specifically, the invention relates to the coupling of thermoplastic pipes made of materials such as polypropylene and polyethylene, by inserting therebetween a connecting piece made of the same material and welding the elements together by means of an electrical heating resistance. The connecting piece is used instead of a sealing member.

When a few volts of current are supplied to the electrical resistance element, the plastic material is caused to melt both at the male end of one of the pipes and at the socket end of the other pipe. A uniform weld is thereby obtained. A sleeve comprising two socket ends can obviously be used for pipes which do not have a socket end.

To produce the above-mentioned uniform weld, it is necessary to apply equal amounts of heat to the male end and the socket end.

2. Description of the Prior Art

The conventional connecting pieces for producing a weld of the above-defined type are produced by injecting a plastics material about an electrical resistance element in the form of a bifilar helicoidal winding designed to be internally embedded in the manner of an armature.

Connecting pieces of this type are difficult to manufacture owing to their reduced thickness which is limited by the annular space available between the male end of one pipe and the socket end of another pipe or sleeve. The tubular elements to be coupled generally have a small nominal diameter which may vary between 50 and 150 mm and rarely exceeds 200 mm. Their thickness does not exceed a few millimeters.

Accordingly, it is difficult to satisfactorily embed the resistance element coaxially in the injected plastic material in such a way that the winding turns of the resistance element are equidistant, thereby avoiding any contact capable of producing a short circuit. It is also difficult to cover this resistance element with plastics material in a uniform manner and to avoid any asymmetry or irregularity in its final position within the connecting piece. Consequently, connecting pieces produced in this manner sometimes have the disadvantage of irregularly heating the tubular ends to be connected.

For this reason, attempts were made to eliminate the problem of covering an electrical resistance by injection by externally coiling the resistance element about a temporary support connection and by locating this resistance on the inner surface of the socket end via its temporary support and in finally removing the support by deformation.

It was thereby possible to produce socket ends provided with an electrical heating resistance element which was disposed in a uniform and suitably centered fashion but this did not solve the problem of adapting it to existing tubular elements in place of a sealing member without altering the ends to be connected.

Efforts were also made to produce helicoidal windings consisting of contiguous turns of electrical wire sheathed in plastic designed to be inserted directly between the pipe ends to be connected after welding together the turn sheathings. However, it was not possible to retain the contiguous turns. Even if these turns can be rendered contiguous, they cease to be thus when the sheathed winding is inserted between the ends to be connected.

SUMMARY OF THE INVENTION

The present invention relates to a method which is designed to obviate the above difficulties. It is characterized in that the electrical heating resistance element is first wound on a tubular plastic support designed to be adapted to one of the tubular ends to be connected. The tubular support and the resistance element are each covered with a tubular cover which can be adapted to the interior of the other pipe end to be connected such that the heating resistance element is disposed coaxially with respect to the two tubular elements to be connected with a wall interposed between the resistance element and each of the tubular ends.

The invention also relates to a connecting piece for implementing this method. This connecting piece is characterized in that it comprises two complementary rings which are concentrically fitted one on the other. The one ring is disposed inside the support on which the bifilar electrical resistance element is coiled and the other ring is externally disposed and forms a cover or sheath covering the electrical resistance element.

As a result of this arrangement, the electrical resistance element is uniformly enclosed in plastic material and is perfectly centered with respect to the two rings and with respect to the tubular ends between which the composite connection formed by the two rings is disposed. In addition, the connection piece which is produced is capable of being inserted between existing tubular elements instead of a sealing member without having to alter the ends to be connected.

Other objects, features and advantages of the present invention will be made apparent in the course of the following detailed description thereof provided with reference to the accompanying exemplary drawings.

BRIEF DESCRIPTION OF THE DRAWINGS

FIG. 1 is a diagrammatic sectional view of a support ring for a connecting piece according to the invention in the free state.

FIG. 2 is a corresponding external view of the support ring showing the bifilar resistance element.

FIG. 3 is a sectional view according to FIG. 1 of the cover or sheath ring in the free state.

FIG. 4 is a sectional view according to FIGS. 1 and 3 of the composite connecting piece according to the invention formed by fitting the rings shown in FIGS. 1 and 3 one over the other.

FIG. 5 is a sectional view according to FIG. 4 of the coupling of two tubular elements by means of a connecting piece according to FIG. 4, with an upper half view of the state of the parts before an electrical current has passed therethrough and a lower half view of the welded parts after passage of the electrical current.

FIG. 6 is a partial sectional view of the coupling shown in FIG. 5 on a smaller scale and presenting more realistically the respective thicknesses of the connected tubular elements, of the annular space which separates them and the rings forming the composite connecting piece.

DESCRIPTION OF THE PREFERRED EMBODIMENT

In the embodiment shown in FIGS. 1–4, the connecting piece R according to the invention is represented in a manner which is not faithful to the exact proportions in order to clarify the drawing and render it easier to comprehend, particularly in terms of the thicknesses involved.

The connecting piece R comprises an inner support ring 1 having the axis X—X. The ring 1 is made of thermoplastic material, for example, polypropylene or polyethylene (FIGS. 1 and 2). The ring 1 has an inner diameter which corresponds to the outer diameter of a male pipe end to be connected.

The support ring 1 is injection molded and comprises a circular end shoulder 2 which projects outwards. Its other end is preferably beveled at 3.

The ring 1 is provided on its periphery with two sets of helicoidal grooves 4a and 4b having the same winding pitch. The grooves 4 may be milled or worked.

Adjacent to the shoulder 2, two parallel openings are cut through the same along a generatrix of the ring 1. On the one hand, they open at the end face of the shoulder 2 and, on the other, in a groove 4a and a groove 4b.

Another opening 7, which is also parallel to the axis, provides communication between two consecutive grooves 4a and 4b close to the bevel end 3 of the ring 1. A bifilar electrical resistance element or wire 8, FIG. 2, is coiled at the bottom of the grooves 4a and 4b and passes through the openings 5, 6 and 7. It has two free ends 9. Starting from one free end 9 and the opening 5, the resistance element 8 follows the helicoidal path of the grooves 4a and then, forming a loop 10 which is inserted in the axial opening 7, it passes over a winding half pitch and passes into the grooves 4b which it leaves via the opening 6 and the other free end 9.

The electrical resistance element is a metal wire, for example, of chromium nickel alloy, preferably having a slightly smaller diameter than the depth of the grooves 4 and the openings 5, 6 and 7, so that it is located beneath the level of the cylindrical surface of the ring 1.

According to the invention, the connecting piece R also comprises a ring cover or sheath 11, FIG. 3, having a corresponding diameter and length to the diameter and length of the ring 1. Its thickness is approximately that of the ring 1 and that of the projection of the shoulder 2 with respect to the ring 1. The ring cover 11 has an inner diameter corresponding to the outer diameter of the ring 1 and an outer diameter corresponding to the inner diameter of the socket end of one of the pipes to be connected. At one end, which is beveled at 12, the ring 11 comprises an inner shoulder 13 which projects inwards with respect to the cavity. The ring 11 is made of the same material as the ring 1.

The connecting piece R, FIG. 4, is formed by inserting the support ring 1 in the sheath ring 11. The support ring 1 abuts with its beveled end against the inner shoulder 13 of the sheath ring 11 and its outer shoulder 2 abuts against the end face of the sheath ring 11.

In the connecting piece R which is mounted as described above, the bifilar resistance element 8 is completely enclosed on all sides in plastic material and is perfectly centered on the axis X—X. As a result, it is able to uniformly diffuse heat in the centripetal and centrifugal directions when current is supplied thereto.

The following is the modus operandi, FIG. 5, for coupling together two plastic tubular elements made of the same thermoplastic material as the rings 1 and 11, for example, an element 14 comprising a male end and an element 15 comprising a socket end.

The connecting piece R is inserted coaxially into the socket end of element 15. This is facilitated by the bevel 12 of the sheath ring 11 and by the corresponding inner diameters of the socket end and the exterior of the sheath ring 11. The male end of the other pipe to be coupled is then inserted in the recess afforded by the cavity of the support ring 1 and the inner element 13 against which the male end 14 abuts, upper half view of FIG. 5.

Alternatively, it is also possible to firstly fit the connecting piece R on the male end 14 and then insert the end 14 bearing the connecting piece R in the socket end of 15.

The two free ends 9 of the bifilar resistance element 8 are then connected to an electric current source supplying a few volts. The resistance element 8 is heated, and it causes the plastic material surrounding it to melt. This applies to both the support ring 1 and male end 14 and to the sheath ring 11 and the socket end of 15. The walls of the two rings 1 and 11 are welded to one another and to the walls of the ends 14 and 15, lower half view of FIG. 5.

To employ the minimal heat conductivity of the thermoplastic material which is used and of the resulting thermal gradient between the heating resistance element and the adjacent walls to be softened, the temperature of the heating resistance element 8 is raised to the maximum, thereby making it possible to soften the closest walls to the vicinity of the walls of the ends 14 and 15 of the assembled pipes without melting the outside portion of these two tubular ends.

FIG. 6 shows the same welded coupling in which the wall thicknesses are more faithful to reality than the preceding ones. The annular space E corresponds to the thickness G of each of the connected tube ends. It will be noted that the walls of the rings 1 and 11 of the connecting piece R are relatively thin.

Numerical Example

With a resistance wire 8 made of chromium nickel having a diameter of 0.85 mm and a resistance of 2.2 ohms/meter, to which a current of a few volts is supplied, approximately 12–15 watts of heat per gram of the connecting piece R is dissipated in 60 seconds.

If the plastic material is polypropylene, which has a melting point of 175° C., the electrical resistance element 8 can be heated to 200° C.

If the plastic material is polyethylene, which has a melting point below 150° C., the rings 1 and 11 of the connecting piece R and the ends 14 and 15 to be connected must be substantially thicker than in the case of the polypropylene shown in FIG. 6.

By virtue of the invention, any standard type of piping having ends 14 and 15 and be equally well coupled without alteration by inserting an electric welding connection R according to the invention as by inserting a sealing member.

As a result of the composite connecting piece R comprising the two rings 1 and 11, the bifilar electrical resistance element is placed in the annular space separating the two tubular ends to be connected in a uniform and well centered position, thereby ensuring that both the centripetal and centrifugal sides are heated in a uniform and symmetrical manner.

The invention can be used to connect plastic pipes intended both for household plumbing systems and industrial pipelines for removing waste water and rain water and for conveying industrial fluids.

What is claimed is:

1. A connecting piece for electrical resistance welding of an inserted male end of one plastic pipe to the socket end of a second plastic pipe, said connecting piece constituting a sealing member interfitted between the male end and the socket end of said plastic pipes and comprising: two complementary concentric plastic rings fitted one to the other, said complementary rings comprising an internal ring having grooves on its radially exterior periphery, an electrical heating resistance element mounted within the base of said grooves, and an outer ring froming the sheath of the connecting piece and having an internal surface defining an attachment cavity which is cylindrical and smooth and having an inner diameter corresponding to the outer diameter of the inner ring, and wherein said internal ring is axially received by such outer ring and is concentric therewith, whereby said electrical heating resistance element is centered between said concentric pipe ends to insure by energizing said electrical heating resistance element uniform melting of the inner and outer rings and high integrity welding of the male end and socket ends of said pipes together.

2. The connecting piece as claimed in claim 1, wherein said inner ring comprises an external projecting shoulder and said outer ring comprises an internal projecting shoulder on respective ends forming abutments for said rings when fitted concentrically one on the other, and wherein said internal projecting shoulder of said outer ring comprises an abutment between the male end and socket end of said two plastic pipe ends being joined.

3. In a welded joint between two tubular plastic elements, one comprising a male end and the other a socket end which receives the male end and electrical heating resistance element inserted therebetween, the improvement wherein: said electric heating resistance element is carried by a connecting piece, said connecting piece consisting of two complementary rings concentrically fitted to each other including an internal ring comprising grooves with said electrical resistance heating element wound within said grooves, an outer ring constituting a sheath of said connecting piece and having an internal surface defining an attachment cavity of cylindrical form and having a smooth surface and having an inner diameter corresponding to the outer diameter of the inner ring, and wherein said internal ring is axially received by said outer ring attachment cavity and wherein said connecting piece has an outer diameter corresponding to the inner diameter of the socket end and an inner diameter corresponding to the outer diameter of the male end, said electrical resistance heating element is centered between said tubular plastic element and said connecting piece, whereby energizing said resistance heating element effects uniform melting of the inner and outer ring of said connecting piece to form a high integrity weld between said connecting piece and said tubular plastic male end and socket end elements.

* * * * *